United States Patent [19]

Sextro et al.

[11] 4,111,912
[45] Sep. 5, 1978

[54] PROCESS FOR THE MANUFACTURE OF COARSE-GRANULAR OXYMETHYLENE POLYMERS

[75] Inventors: Günter Sextro; Karlheinz Burg, both of Wiesbaden; Helmut Schlaf, Kelkheim; Hans-Dieter Sabel, Schwalbach, Taunus; Alwin Heller, Erzhausen, all of Fed. Rep. of Germany

[73] Assignee: Hoechst Aktiengesellschaft, Frankfurt am Main, Fed. Rep. of Germany

[21] Appl. No.: 793,859

[22] Filed: May 4, 1977

[30] Foreign Application Priority Data

May 6, 1976 [DE] Fed. Rep. of Germany ....... 2620017

[51] Int. Cl.$^2$ .................................................. C08G 2/28
[52] U.S. Cl. ...................................... 528/45; 528/503; 528/270
[58] Field of Search ................................... 260/67 FP

[56] References Cited

U.S. PATENT DOCUMENTS

| 3,174,948 | 3/1965 | Wall et al. | 260/67 FP |
| 3,219,623 | 11/1965 | Berardinelli | 260/67 FP |
| 3,371,066 | 2/1968 | Grundmann et al. | 260/67 FP |
| 4,046,738 | 9/1977 | Sextro et al. | 260/67 FP |

FOREIGN PATENT DOCUMENTS 961,595  1/1975  Canada ................................ 260/67 FP

*Primary Examiner*—Lucille M. Phynes
*Attorney, Agent, or Firm*—Curtis, Morris & Safford

[57] ABSTRACT

Granular oxymethylene polymers are prepared by cooling a solution or dispersion of an oxymethylene polymer, the temperature of the said solution or dispersion being above the sintering temperature of the oxymethylene polymer, to a temperature just below the said sintering temperature. As dissolving or dispersing agent there is used a mixture of methanol and water. The cooling of the said solution or dispersion is effected in two stages while using a liquid cooling agent or a cooling device. After precipitation the coarse-granular polymer is separated from the fine-granular portion. It is suitable as engineering plastic for preparing molded articles.

4 Claims, No Drawings

PROCESS FOR THE MANUFACTURE OF COARSE-GRANULAR OXYMETHYLENE POLYMERS

This invention relates to a process for making a coarsely granular oxymethylene polymer.

It is known to produce oxymethylene polymers (POM) by copolymerizing formaldehyde or cyclic oligomers of formaldehyde, especially 1,3,5-trioxane, with suitable comonomers, especially cyclic ethers or cyclic acetals (see, for example, U.S. Pat. Nos. 3,027,352 and 3,803,094). It is also known that granular oxymethylene polymers are obtained by introducing a solution of an oxymethylene polymer into a precipitant, the temperature of which is closely below the sintering temperature of the oxymethylene polymer (see U.S. Pat. No. 3,371,066).

It is also known that a crystalline granular POM powder can be produced by very slowly cooling a POM-solution and filtering the crystalline polymer from the mother liquor under thermostatic conditions (see German Auslegeschrift No. 21 08 747). In this way the low molecular portions are removed with the mother liquor, and there is obtained a fine powder having a particle size of 2 to 10 μm. The known process has the disadvantage that the slow cooling of the POM solution and the filtering off of the POM crystals at a relatively high temperature and also obtaining the product in a very fine grained form which is difficult to filter, makes the whole process expensive and uneconomical.

It is the object of the invention to produce coarsely granular oxymethylene polymers without low molecular portions.

The invention provides a process for making a coarsely granular oxymethylene polymer (POM) containing in addition to oxymethylene units, from 0.1 to 20 per cent by weight of oxyalkylene units having from 2 to 8 adjacent carbon atoms in the main chain thereof, by cooling a solution or fine dispersion of the POM and subsequently separating the precipitated POM, which process comprises cooling in two stages a solution or dispersion of the POM in a methanol/water mixture, the temperature of which is 5 to 65° C above the sintering temperature ($T_s$) of the POM, in the first stage to a temperature of 0° to 10° C above $T_s$, and in the second stage to a temperature of 1° to 10° C below $T_s$, and subsequently separating and drying the solid POM particles obtained by the cooling and having a particle diameter exceeding 100 μm.

The invention also relates to the granular oxymethylene polymers obtained in accordance with the process described above.

As oxymethylene polymers within the meaning of the invention there are to be understood poly(oxymethylenes) which contain in the main valence chain, in addition to oxymethylene units, from 0.1 to 20, preferably from 0.5 to 10, per cent by weight of oxyalkylene units having from 2 to 8, preferably 2, 3 or 4, adjacent carbon atoms. Especially suitable are oxymethylene polymers, containing 1 to 5 per cent by weight of oxylkylene units. The oxymethylene polymers preferably show primary terminal alcohol groups.

The oxymethylene polymers are produced in known manner by polymerizing the monomers in bulk, suspension or solution in the presence of cationically active catalysts, for example, at a temperature of 0° to 100° C., preferably of 50° to 90° C., (see for example U.S. Pat. No. 3,027,352). There are used as cationically active catalysts (1) protonic acids, for example, perchloric acid, (2) esters of protonic acids, especially esters of perchloric acid with low molecular weight aliphatic alcohols, for example, perchloric acid tert.-butyl ester, (3) anhydrides of protonic acids, especially mixed anhydrides of perchloric acid and a low molecular weight aliphatic carboxylic acid, for example, acetyl perchlorate, (4) Lewis acids, especially halides of boron, tin, titanium, phosphorus, arsenic and antimony, for example, boron trifluoride, tin tetrachloride, titanium tetrachloride, phosphorus pentachloride, phosphorus pentafluoride, arsenic pentafluoride and antimony pentafluoride, and (5) complex compounds or salt-like compounds, preferably etherates or onium salts, of Lewis acids, for example, boron trifluoride diethyl etherate, boron trifluoride di-n-butyl etherate, triethyl-oxonium tetrafluoroborate, trimethyl-oxonium hexafluorophosphate, triphenylmethyl hexafluorarsenate, acetyl tetrafluoroborate, acetyl hexafluorophosphate and acetyl hexafluoroarsenate.

The quantity of the catalysts used in the copolymerisation depends primarily on the strength of their activity. In general, the catalysts are used in a quantity by weight of 0.1 to 2000 ppm, preferably 0.2 to 500 ppm, calculated on the total quantity of the compounds to be polymerised. Catalysts having a good activity, such as boron trifluoride, are advantageously used in a quantity by weight of 10 to 150 ppm, and preferably 20 to 100 ppm, calculated on the total quantity of compounds to be polymerised. For complex compounds or salt-like compounds among the catalysts mentioned the corresponding molar quantities apply. Very strongly active catalysts such as perchloric acid are used in quantities of 0.2 to 10 ppm, and preferably 0.3 to 5 ppm.

In general, it is recommended to use the catalysts in a diluted form. Gaseous catalysts are diluted with an inert gas, for example, nitrogen and noble gases such as argon, and liquid or solid catalysts are dissolved in an inert solvent. As solvents there are especially suitable aliphatic or cycloaliphatic and also halogenated or nitrated aliphatic or nitrated aromatic hydrocarbons. As examples there may be mentioned cyclohexane, methylene chloride, ethylene chloride, nitromethane and nitrobenzene. The weight ratio of catalyst to diluent is usually 1:5 to 1:10,000, and preferably 1:10 to 1:100. Very strongly active catalysts are advantageously diluted in the ratio of 1:5000 to 1:20,000.

The polymerisation process is preferably carried out under an atmosphere of an inert gas and with the exclusion of moisture. As inert gases noble gases for example, argon, and nitrogen are preferably suitable.

As compounds that are capable of being copolymerized with trioxane there are suitable above all (a) cyclic ethers having 3, 4 or 5 ring members, preferably epoxides, (b) cyclic acetals, preferably formals, having 5 to 11 and preferably 5, 6, 7 or 8, ring members, and (c) linear polyacetals, preferably polyformals.

As comonomers for trioxane there are especially suitable compounds of the formula

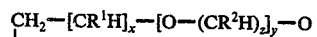

in which (A) $R^1$ and $R^2$ are identical or different and each represent a hydrogen atom, an aliphatic alkyl radical having from 1 to 6, and preferably 1, 2, 3 or 4, carbon atoms, or a phenyl radical, and (a) $x$ is 1, 2 or 3 and $y$ is zero, or (b) $x$ is zero, $y$ is 1,2 or 3 and $z$ is 2, or (c) $x$ is zero, $y$ is 1 and $z$ is 3, 4, 5 or 6, or (B) $R^1$ represents an alkoxymethyl radical having from 2 to 6, and preferably 2, 3 or 4, carbon atoms or a phenoxymethyl radical, $x$ is 1, and $y$ is zero and $R^2$ has the meaning given above.

As cyclic ethers there are used, for example, ethylene oxide, propylene oxide, styrene oxide, cyclohexene oxide, oxacyclobutane and phenyl glycidyl ether, and as cyclic formals, for example, 1,3-dioxolane, 1,3-dioxane, 1,3-dioxepane and 1,3,6-trioxocane, and also 4-methyl-1,3-dioxolane, 4-phenyl-1,3-dioxolane, 1,3-dioxonane and 1,3-dioxacycloheptene-(5). As linear polyformals there are suitable above all poly(1,3-dioxolane) and poly(1,3-dioxepane).

For the production of oxymethylene polymers having definite ranges of molecular weight it is of advantage to carry out the polymerization in the presence of a regulator. For this purpose there are suitable above all formaldehyde dialkyl acetals having from 3 to 9, and preferably 3, 4 or 5, carbon atoms, for example, formaldehyde-dimethylacetal, -diethylacetal, -dipropylacetal and -dibutylacetal, and also low molecular weight aliphatic alcohols, preferably alkanols having from 1 to 4 carbon atoms, for example, methanol, ethanol, propanol and butanol. The regulator is usually used in a quantity up to 0.5 per cent. by weight, and preferably of 0.005 to 0.1 per cent. by weight, calculated on the total quantity of compounds to be polymerized.

The oxymethylene polymers are advantageously subjected, in order to remove unstable fractions to a thermal, controlled, partial degradation up to primary terminal alcohol groups (see U.S. Pat. Nos. 3,174,948, 3,219,623 and 3,666,714). The thermal treatment is carried out at a temperature of 130° to 200° C., and preferably 140° to 190° C., more especially under non-acid conditions in aqueous/methanolic solution, advantageously in the presence of a compound having a basic reaction, for example, a low molecular weight tertiary aliphatic amine, such as triethylamine or triethanolamine or a secondary alkali metal phosphate such as disodium hydrogenphosphate. Especially favourable is a temperature of 150° to 180° C. The duration of the thermal treatment is 10 seconds to 2 hours depending on the temperature, and preferably 1 minute to 60 minutes. The higher the temperature the shorter may be the residence time. At 180° C. about 1 to 2 minutes are sufficient, at 160° C. about 5 to 10 minutes, at 150° C. about 10 to 30 minutes, and at 140° C. about 20 to 60 minutes. The treatment is preferably carried out with a substantial exclusion of oxygen.

As starting material for the process of the invention there is used a solution or fine dispersion of an oxymethylene polymer, the polymer content of which is from 3 to 35, and preferably 5 to 30, per cent. by weight. Very good results are obtained with a polymer solution or dispersion, which contains 10 to 25 per cent. by weight of oxymethylene polymer.

As solvent or dispersion medium there is used a mixture of 99.9 to 40 per cent. by weight of methanol and 0.1 to 60 per cent. by weight of water. There are especially suitable mixtures consisting of 95 to 70, and preferably 92 to 80, per cent. by weight of methanol and 5 to 30, preferably 8 to 20, per cent. by weight of water. The methanol/water mixture may contain the basically reacting compound in a quantity of 50 to 10,000 ppm, preferably from 100 to 1,000 ppm (calculated on the methanol/water mixture). The temperature of the solution or dispersion is in the range from 5° to 65° C, and preferably 10° to 60° C., above the sintering temperature of the oxymethylene polymer, the temperature range of 25° to 55° C. above the sintering temperature being especially advantageous.

The sintering temperature $(T_S)$ is the temperature at which the solid polymer particles suspended in the particular methanol/water mixture become soft on the surface and agglutinate without melting completely. The sintering temperature depends on the composition and molecular weight of the polymer and also on the nature of the solvent or dispersion medium. The sintering temperature of the oxymethylene polymers used in accordance with the invention is within the range of 100° to 140° and preferably 125° to 135° C.

The characteristic features of the invention are the cooling of the POM solution or dispersion in two stages, in the first of which stages cooling to the sintering temperature or closely above it is carried out and in the second stage cooling to a temperature closely below the sintering temperature, and also the subsequent isolation of the coarsely granular product by separating the finely granular portions, which have a low reduced specific viscosity. As cooling media there are used liquid cooling agents or cooling devices.

As a liquid cooling agent and precipitant there is used either a methanol/water mixture, the composition of which is within the same range as that of the above mentioned solvent or dispersion medium, or a suspension of 1 to 25 per cent. by weight, and preferably 5 to 15 per cent. by weight, of one of the oxymethylene polymers already precipitated and 99 to 75 per cent. by weight, and preferably 95 to 85 per cent. by weight, of a methanol/water mixture, the composition of which is in the same range as that of the above mentioned solvent or dispersion medium. The liquid cooling agent is maintained at a temperature of at most 2, and preferably 2° to 10° C., below the sintering temperature of the oxymethylene polymer, and the temperature range of 2° to 5° C. below the sintering temperature is especially recommended.

The methanol used within the scope of this invention may contain up to 30, and preferably up to 10, per cent. by weight of organic impurities soluble in methanol, which impurities are usually formed as by-products in the synthesis of oxymethylene polymers, for example, formaldehyde, cyclic oligomers of formaldehyde, methylal, glycol, glycol-formal, glycol monomethyl ether, glycol dimethyl ether and also lower aliphatic alcohols, lower aliphatic esters and acetone.

In using a liquid cooling medium the solution or fine dispersion of the oxymethylene polymer is continuously metered into a partial amount of the cooling agent or precipitant which is in turbulent flowing movement. The temperature of the mixture obtained is 0° to 10° C., and preferably 0° to 6° C., above the sintering temperature of the oxymethylene polymer, especially favourable is a temperature of 1° to 4° C. above the sintering temperature. After an average residence time of 0.5 to 5, and preferably 1 to 3, seconds the mixture so obtained is mixed with the remainder of the turbulent flowing cooling agent, the mixture resulting therefrom has a temperature of 1° to 10° C. and preferably 1° to 5° C. below the sintering temperature of the oxymethylene polymer. Especially favourable is the temperature range of 2° to 4° C. below the sintering temperature.

In carrying out the process of the invention continuously, for example, the POM solution or dispersion is mixed with a partial amount of the cooling agent in a tube, and the resulting mixture is mixed in an autoclave with the remainder of the cooling agent. The suspension containing the granular oxymethylene polymer is removed from the autoclave at the same rate as the mixture of starting material and the first portion of the cooling agent is supplied thereto. If desired, a partial current of the suspension being removed from the autoclave is recycled and used as the first portion of the cooling agent, the concentration of the suspension being adjusted as desired by adding a methanol/water mixture within the scope of the invention. Especially favourable is a mode of operation in which the cooling agent is circulated and the suspension containing granular oxymethylene polymer is removed from circulation at the same rate as starting material and optionally additional methanol/water mixture are supplied. It is recommended to carry out the process of the invention under an atmosphere of an inert gas, for example, under a noble gas or under nitrogen. The partial pressure of the inert gas is then 1 to 20 bar, and preferably 2 to 10 bar. Depending on the particular temperature used the total pressure if 5 to 40 bar, and preferably 8 to 30 bar.

The total average residence time of the oxymethylene polymer in the liquid cooling agent and precipitant is 1 minute to 12 hours, and preferably 2 minutes to 5 hours.

The ratio by volume of polymer solution or dispersion to the quantity of cooling agent, into which the polymer solution or dispersion is first introduced, is generally 1:2 to 1:35, and preferably 1:10 to 1:20. The ratio by volume of this first portion of cooling agent to the remainder of the cooling agent is within the range of 1:2 to 1:50, and preferably 1:3 to 1:10.

The cooling of the solution or dispersion of the oxymethylene polymer may also be carried out by means of cooling devices. Especially suitable are those devices which impart to the polymer solution or dispersion a turbulent flowing movement, for example, tubes the temperature of which can be kept constant. The use of a cooling device is especially advantageous for the second stage of cooling in the process of the invention. The average residence time during which the solution or dispersion of the oxymethylene polymer to be cooled is maintained in the first cooling stage by means of the cooling medium at a temperature of 0° to 10° C. above the sintering temperature of the oxymethylene polymer, is 0.5 to 5 seconds, and preferably 1 to 3 seconds.

In cooling the POM solution or dispersion there are formed by precipitation or agglomeration solid polymer particles having different particle sizes. The main portion of the POM particles obtained consists of coarsely granular particles having a particle diameter of more than 100 $\mu$m, and a small amount of finely granular particles having a particle diameter of preferably less than 50 $\mu$m (sieve analysis). The coarsely granular particles have preferably a particle diameter of 200 to 2000 $\mu$m and especially of 300 to 1000 $\mu$m. The quantity of the finely granular product to be removed is generally less than 20 per cent. by weight, calculated on the total quantity of solid polymer particles. The proportion of fine particles is preferably 2 to 15 per cent. by weight, and especially 3 to 10 per cent. by weight.

From the suspension obtained by the cooling, which suspension is optionally further cooled to a temperature below 100° C., preferably to 20° to 60° C., there are removed the coarsely granular POM particles by the usual separating methods, for example, by filtering, centrifuging or decanting. From the remaining mixture the finely granular POM particles can be removed, and the solvent can be used again as a liquid cooling agent. The separated oxymethylene polymer is finally dried at a temperature of 20° to 135° C., and preferably of 50° to 120° C. Drying under an atmosphere of an inert gas, for example, under an atmosphere of noble gas or nitrogen, is recommended.

The coarsely granular oxymethylene polymers obtained in accordance with the invention are macromolecular. The values of their reduced specific viscosity (RSV) are 0.3 to 2.0, and preferably 0.5 to 1.5, dl/gm (measured with a solution of 0.5 per cent. strength by weight of the polymer in $\gamma$-butyrolactone, which contains 2 per cent. by weight of diphenylamine as stabilizer, at a temperature of 140° C.). The crystallite melting points of the oxymethylene polymers are within the range of 140° to 180° C., their melting index values (MFI 190/2) are 0.1 to 50, and preferably 1 to 30 gms per 10 minutes (measured according to DIN 53 735 at a temperature of 190° C. and a load of 2.16 kg). The apparent density of the coarsely granular oxymethylene polymers is generally more than 300, and preferably 350 to 550, gm per liter (determined with polymers dried under nitrogen at a temperature of 70° C. after being homogeneously mixed for 2 minutes in a laboratory fluid mixer at 3000 revolutions per minute). The RSV-values of the finely granular products are below 0.3 dl/gm and preferably 0.05 to 0.25 and especially 0.1 to 0.2 dl/gm.

The oxymethylene polymers obtained in accordance with the invention may also be stabilized by homogeneously mixing them with stabilizers against the influence of heat, oxygen and/or light. The homogenization is carried out normally in an ordinary commercial mixing device, for example, an extruder, at a temperature above the melting point of the polymer up to 250° C., and preferably a temperature of 180° to 210° C. The quantity of stabilizers added amounts to a total of 0.1 to 10, and preferably 0.5 to 5, per cent. by weight calculated on the total mixture.

As stabilizers there are suitable above all bisphenol compounds, alkaline earth metal salts of carboxylic acids and guanidine compounds. As bisphenol compounds there are used preferably esters of monobasic 4-hydroxyphenyl-alkanoic acids substituted in the nucleus once or twice by an alkyl radical having from 1 to 4 carbon atoms, which acids contain 7 to 13, and preferably 7, 8 or 9, carbon atoms, with aliphatic di-, tri- or tetra-hydric alcohols having 2 to 6, and preferably 2, 3 or 4, carbon atoms, for example, esters of $\Omega$-(3-tert.-butyl-4-hydroxyphenyl)-pentanoic acid, $\beta$-(3-methyl-5-tert.-butyl-4-hydroxyphenyl)-propionic acid, (3,5-di-tert.-butyl-4-hydroxyphenyl)-acetic acid, $\beta$-(3,5-di-tert,-butyl-4-hydroxyphenyl)-propionic acid or (3,5-di-isopropyl-4-hydroxyphenyl)-acetic acid with ethylene glycol, propanediol-(1,2), propanediol-(1,3), butanediol-(1,4), hexanediol-(1,6), 1,1,1-trimethylol-ethane or pentaerythritol.

As alkaline earth metal salts of carboxylic acids there are used, more especially, alkaline earth metal salts of aliphatic, preferably hydroxyl group-containing, mono-, di- or tri-basic carboxylic acids having 2 to 20, and preferably 3 to 9, carbon atoms, for example, the calcium or magnesium salts of stearic acid, ricinoleic acid, lactic acid, mandelic acid, malic acid or citric acid.

As guanidine compounds there are used compounds of the formula

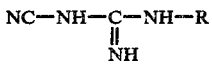

in which R represents a hydrogen atom, a cyano group or an alkyl radical having 1 to 6 carbon atoms, for example, cyanoguanidine, N-cyano-N'-methyl-guanidine, N-cyano-N'-ethyl-guanidine, N-cyano-N'-isopropyl-guanidine, N-cyano-N'-tert.-butyl-guanidine or N,N'-dicyanoguanidine. The guanidine compound is used optionally in a quantity of 0.01 to 1, and preferably 0.1 to 0.5, per cent. by weight, calculated on the total mixture.

There may also be added to the oxymethylene polymers prepared in accordance with the invention known light stabilizers such as benzophenone-, acetophenone- or triazine-derivatives. Other usual additives such as dyestuffs, pigments, reinforcing agents and fillers, and nucleating agents, may also be added.

The oxymethylene polymers of the invention have improved mechanical properties and can be processed by all the methods usually employed for thermoplastics, for example by injection moulding, extrusion pressing, extrusion blowing, melt spinning and deep-drawing. They are suitable as materials for the production of semi-finished products and finished products such as shaped articles, for example bars, rods, plates, ribbons, bristles, threads, fibres, films, sheets, tubes and flexible pipes, and also household articles, for example, cups and tumblers, and machine parts, for example, casings and gear wheels. They are especially useful as engineering plastic material for the production of dimensionally stable and true to shape articles.

The following Examples illustrate the invention, the parts and percentages being by weight unless otherwise stated.

EXAMPLES 1 to 12

Varying amounts of a copolymer of 98 per cent of trioxane and 2 per cent of ethylene oxide and having an RSV-value of 0.65 dl/gm a MFI (190/2) of 25 mg/10 minutes are mixed with 100 parts of a methanol/water mixture containing 1,000 ppm of triethylamine. The resulting mixture is heated for 5 minutes at a temperature of 160° C, whereby the polymer dissolves. Per minute, 1 liter of the solution is mixed continuously with 10 liters of a suspension of 10 parts (3 in Example 1; 5 in Example 2; 7.5 in Example 3) of an already precipitated oxymethylene polymer in 90 parts (97 in Example 1; 95 in Example 2; 92.5 in Example 3) of the above mentioned methanol/water mixture. The suspension is flowing in turbulent motion through a tube at a speed of 2 m.s.$^{-1}$ and has a temperature of 125° C. (At a sintering temperature of the polymer of 127° C the temperature of the cooling agent is therefore 2° C below the sintering temperature). The resulting mixture, the temperature of which is 128° to 130° C, is mixed after 2 seconds via an immersion tube with 13 liters of a suspension of the above mentioned composition, which is flowing in turbulent motion in an autoclave and is maintained at a temperature of 125° C. Under these conditions the polyoxymethylene precipitates completely. 10 Liters of the suspension so formed are continuously discharged from the autoclave per minute via a pipe line and again mixed with the solution (see above). The concentration of the polymer in the supension is adjusted in Examples 5 to 8 to 10 per cent by metering in appropriate quantities of a methanol/water mixture of the above mentioned composition. The level of liquid in the autoclave is kept constant by continuously discharging the suspension at the same rate as the polymer solution and optionally the methanol/water mixture are added. The discharging is carried out with simultaneous cooling to room temperature, and then separation of the coarsely granular polymer from the precipitant and fine grained polymer is effected by centrifuging by means of a sieve centrifuge (mesh 100 μm). The fine grained polymer is then removed from the centrifugate by means of a separator, and the quantity and also the RSV-value of this polymer are determined. The content of dry matter in the coarsely granular product is then determined, and the product is dried at a temperature of 70° C. under nitrogen. The apparent density of the dried product is then determined. Further details and the test results are apparent from Table 1.

Table 1

| Example | Solvent (% by wt.) Methanol/water | Polymer concentration* (% by wt.) | Content of dry matter (% by wt.) | Apparent density (g/l) | RSV-value (dl/g)** | Quantity of particles (% by wt.) having φ <100 μm |
|---|---|---|---|---|---|---|
| 1 | 85/15 | 3 | 43 | 320 | 0.27 | 14 |
| 2 | 85/15 | 5 | 45 | 310 | 0.23 | 10 |
| 3 | 85/15 | 7.5 | 44 | 320 | 0.20 | 7 |
| 4 | 85/15 | 10 | 43 | 360 | 0.21 | 6 |
| 5 | 85/15 | 15 | 44 | 350 | 0.19 | 4 |
| 6 | 85/15 | 20 | 48 | 350 | 0.20 | 3 |
| 7 | 85/15 | 25 | 47 | 370 | 0.14 | 3 |
| 8 | 85/15 | 30 | 53 | 400 | 0.11 | 2 |
| 9 | 85/15 | 10 | 43 | 360 | 0.20 | 6 |
| 10 | 80/20 | 10 | 42 | 350 | 0.22 | 6 |
| 11 | 50/50 | 10 | 40 | 330 | 0.19 | 4 |
| 12 | 45/55 | 10 | 42 | 340 | 0.15 | 3 |

*in the solution.
**of the finely divided product.

EXAMPLE 13

Example 4 is repeated with a copolymer of 98 per cent. of trioxane and 2 per cent. of ethylene oxide and having an RSV-value of 0.76 dl/gm and a MFI (190/2) of 9 gm/10 minutes. The following results are obtained:

Dry matter content of the coarsely granular product: 46%

Apparent density of the coarsely granular product: 340 gm/l

Quantity of particles having a particle diameter <100 μm: 5%

RSV-value of the finely grained product: 0.17 dl/gm

EXAMPLE 14

25 kg of a copolymer of 98 per cent. of trioxane and 2 per cent. of ethylene oxide, and having an RSV-value of 0.65 dl/gm, a crystallite melting point of 165° C. and a MFI (190/2) of 25 gm/10 minutes, are mixed with 75 kg of a mixture of 95.5 per cent. of methanol, 4.4 per cent. of water and 0.1 per cent. of triethylamine. The resulting mixture is heated under nitrogen for 5 minutes at a temperature of 185° C., whereupon the polymer dissolves.

Per minute, 1 liter of the solution is continuously mixed with 10 liters of a suspension of 10 kg of an already precipitated oxymethylene polymer in 90 kg of a methanol/water/triethylamine mixture of the above mentioned composition. The suspension is flowing in turbulent motion at a speed of 2 m,s$^{-1}$ through a tube and has a temperature (T$_1$) of 131° C. (At a sintering temperature of the polymer of 133° C. the temperature of the cooling medium is therefore 2° C. below the sintering temperature). The resulting mixture, the temperature of which ($T_2$) is 136° C., is mixed after 2 seconds via an immersion tube with 100 liters of a suspension of the above mentioned composition, which is flowing in an autoclave in turbulent motion and is maintained at a temperature ($T_3$) of 131° C.

10 Liters of the resulting suspension are continuously removed per minute from the autoclave via a pipeline and are mixed with the above mentioned polymer solution. The concentration of polymer in the suspension in the autoclave is kept approximately constant by the addition of 1.9 liters per minute of a methanol/water/triethylamine mixture of the above mentioned composition. The degree to which the autoclave is filled is kept approximately constant by continuously discharging suspension at the same rate as the mixture of polymer solution and methanol/water/triethylamine mixture is added.

The coarsely granular polymer obtained is separated from the suspension removed, which is cooled to room temperature, by centrifuging by means of a sieve centrifuge (mesh 100 μm). 77 per cent. of the polymer particles have a diameter above 400 μm, and 2 per cent. have a diameter below 100 μm. The separated product is dried under nitrogen at a temperature of 70° C. The content of dry matter of the coarsely granular product is 48 per cent.

The apparent density of the dried polymer is 400 gm/l. The RSV-value of the coarsely granular product is 0.67 dl/gm, and that of the fine grained product is 0.12 dl/gm.

EXAMPLE 15

Example 14 is repeated with the following changes: As solvent and cooling agent there is used a mixture of 97.5 per cent. of methanol, 2.4 per cent. of water and 0.1 per cent. of triethylamine. The temperatures $T_1$, $T_2$ and $T_3$ are 132° C., 137° C. and 132° C., respectively, and the sintering temperature of the polymer is 134° C.

The precipitated polymer particles contain 84 per cent. having diameters above 400 μm and 1 per cent. having diameters below 100 μm. The content of dry matter in the coarsely granular product is 54 per cent. and the apparent density is 500 gm/l. The RSV-value of the coarsely granular product is 0.66 dl/gm, and that of the fine grained product is 0.07 dl/gm.

EXAMPLE 16

25 Parts of a copolymer of 98 per cent. of trioxane and 2 per cent. of ethylene oxide and having an RSV-value of 0.65 dl/gm, a crystallite melting point of 165° C. and a MFI (190/2) of 25 gm/10 minutes, are mixed with 75 parts of a mixture of 85 per cent. of methanol, 14.9 per cent. of water and 0.1 per cent. of triethylamine. The resulting mixture is heated for 5 minutes at a temperature of 160° C., whereupon the polymer dissolves. Per minute, 1 liter of the solution is continuously mixed with 3 liters of a cooling agent (I), consisting of a methanol/water mixture of the above mentioned composition. The cooling agent flows through a tube in turbulent motion at a speed of 2 m.sec.$^{-1}$ and has a temperature of 120° C. (At a sintering temperature of the polymer of 127° C. the temperature of the cooling agent is therefore 7° C. below the sintering temperature). The resulting mixture, the temperature of which is 130° to 132° C., is introduced after 2 seconds via an immersion tube into 60 liters of a cooling agent (II), consisting of a suspension of 5 per cent. of an already precipitated oxymethylene polymer and 95 per cent. of a methanol/water mixture of the above mentioned composition, which cooling agent flows in turbulent motion in an autoclave and is maintained at a temperature of 125° C. The degree to which the autoclave is filled is kept constant by continuously discharging suspension at the same rate as the mixture of solution and cooling agent is added.

From the suspension so discharged the precipitated coarsely granular polymer is then separated from the cooling agent and from fine grained product by centrifuging in a manner analogous to that in Example 1. 74 per cent. of the polymer particles have a diameter above 400 μm, and 4 per cent. have a diameter below 100 μm. The coarsely granular product is dried at a temperature of 70° C. under nitrogen. The content of dry matter in the coarsely granular product is 40 per cent., and its apparent density is 310 gm/l. The RSV-value of the coarsely granular product is 0.67 dl/gm, and that of the fine grained product is 0.14 dl/gm.

EXAMPLES 17 TO 21.

Different parts of a copolymer of 98 per cent. of trioxane and 2 per cent. of ethylene oxide and having an RSV-value of 0.65 dl/gm, a crystallite melting point of 165° C. and a MFI (190/2) of 25 gm/10 minutes are mixed with 100 parts of a methanol/water mixture, which contains 1000 ppm of triethylamine. The resulting mixture is heated for 5 minutes at a temperature of 160° C., whereupon the polymer dissolves. Per minute 1 liter of the solution is continuously mixed with 10 liters of a suspension of an already precipitated oxymethylene polymer in a methanol/water mixture. The suspension is flowing in turbulent motion at a speed of 3 m.s$^{-1}$ through a tube and has a temperature of 125° C. (At a sintering temperature of the polymer of 127° C. the temperature of the liquid cooling agent is therefore 2° C. below the sintering temperature.) The resulting mixture, the temperature of which is first 128° to 130° C., reaches after 2 seconds a section of the tube which is provided with a thermostatic jacket, in which the mixture flowing turbulently is cooled in the course of 3 seconds to a temperature of 125° C. Then the mixture is mixed with 100 liters of a suspension of the above mentioned composition, which flows in turbulent motion in an autoclave and at a temperature of 125° C.

10 Liters of the suspension so formed are continuously removed per minute from the autoclave via a pipeline and are passed on to be mixed again with the solution (see above). The concentration of polymer in the suspension is adjusted to 10 per cent. in Examples 18, 19 and 21 by metering in appropriate quantities of a methanol/water mixture of the above mentioned composition. The level of the liquid in the autoclave is kept constant by continuously discharging suspension at the same rate as polymer solution and optionally methanol/water mixture are added. The discharging is effected with simultaneous cooling to room temperature, and subsequently the coarsely granular polymer is separated from the precipitant and the fine grained product by centrifuging in a manner analogous to that in Example 1. The fine grained polymer is then separated from the centrifugate, and the quantity of this polymer is determined. Then the content of dry matter in the coarsely granular product is determined, and the product is dried at a temperature of 70° C. under nitrogen.

The apparent density of the dried product is then determined. Further details and the test results are shown in Table 2.

The behaviour under impact of test specimens, which had been made from the coarsely granular product of the invention by injection moulding, is tested in accordance with DIN 53 443 in the falling bolt test. For this purpose there are used square plates the sides of which are 60 mm long and which have a thickness of 2 mm, and a falling bolt weighing 100 grams. The ring opening of the bearing surface is, departing from the norm, 25 mm. The height of the fall is a measure of the toughness of the material.

Table 2

| Example | 17 | 18 | 19 | 20 | 21 |
|---|---|---|---|---|---|
| Solvent (%) methanol/water | 85/15 | 85/15 | 85/15 | 90/10 | 90/10 |
| Polymer concentration in the solution (%) | 10 | 15 | 20 | 10 | 20 |
| Quantity of particles (%) | | | | | |
| (a) having $\theta > 400$ μm | 75 | 81 | 82 | 79 | 85 |
| (b) having $\theta < 100$ μm | 7 | 5 | 4 | 5 | 3 |
| RSV-value (dl/gm) | | | | | |
| (a) coarsely granular product | 0.69 | 0.67 | 0.68 | 0.67 | 0.65 |
| (b) fine grained product | 0.20 | 0.14 | 0.16 | 0.14 | 0.11 |
| Content of dry matter (%) | 45 | 44 | 48 | 49 | 51 |
| Apparent density (gm/l) | 350 | 370 | 360 | 360 | 390 |
| Height of fall (cm) | 160 | 150 | 150 | 160 | 130 |

COMPARISON EXAMPLE

10 Parts of a copolymer of 98 per cent. of trioxane and 2 per cent. of ethylene oxide and having an RSV-value of 0.65 dl/gm, a crystallite melting point of 165° C. and a MFI (190/2) of 25 gm/10 minutes are mixed with 100 parts of a mixture of 60 percent. of methanol, 39.9 per cent. of water and 0.1 per cent. of triethylamine. The resulting suspension is heated for 5 minutes at 160° C., whereupon the polymer dissolves. This solution is cooled to a temperature of 135° C., and is mixed in an autoclave with 30 parts of a mixture of 60 per cent. of methanol and 40 per cent. of water, which is turbulently stirred and the temperature of which is 125° C. (At a sintering temperature of the polymer of 127° C. the temperature of the precipitant is therefore 2° C. below the sintering temperature.) After an average residence time in the autoclave of 15 minutes the polymer suspension obtained is discharged from the bottom of the autoclave. By centrifuging the suspension by means of a sieve centrifuge (mesh 100 μm) the coarsely granular portion of the solid product is separated. The coarsely granular product is obtained in a quantity of 45 per cent. (calculated on the total quantity of the solid product). Its content of dry matter is about 31 per cent. and its apparent density is 260 gm/l. The RSV-value of the coarsely granular product is 0.69 dl/gm, and that of the fine grained portion is 0.60 dl/gm. The mixture of coarsely granular product and fine grained product originally obtained is worked up into test specimens, which are subjected to the falling bolt test analogous to that in Examples 17 to 21. A falling height of 90 cm is measured.

What is claimed is:

1. A process for making a granular oxymethylene polymer (POM) containing, in addition to oxymethylene units, from 0.1 to 20 per cent by weight of oxyalkylene units having from 2 to 8 adjacent carbon atoms in the main chain thereof, comprising the steps of cooling a solution or fine dispersion of the POM in a methanol/water mixture, the temperature of which is 5° to 65° C above the sintering temperature of the POM ($T_s$), in a first stage to a temperature of 0° C. to 10° C above $T_s$ and then cooling the mixture in a second stage to a temperature of 1° C to 10° C. below $T_s$ to form a suspension of POM particles having particle diameters both above and below 100 microns, recovering from said suspension and isolating from smaller particles, the solid POM-particles having a particle diameter exceeding 100 μm and drying them.

2. Process according to claim 1, which comprises carrying out the two-stage cooling of the solution or dispersion of POM
   first by admixture with a turbulently flowing liquid cooling agent and then with the aid of a cooling device.

3. Process according to claim 1, which comprises maintaining a solution or dispersion of POM during the first cooling stage for 0.5 to 5 seconds at a temperature of 0° to 10° C. above $T_s$.

4. Process according to claim 1, which comprises separating the POM particles having a particle diameter of more than 100 μm by filtering or centrifuging the suspension obtained after the cooling.

* * * * *